Nov. 9, 1954 R. R. WOOD 2,693,633
TRANSFER APPARATUS FOR DRILL PIPE PROTECTORS
Filed June 16, 1949 4 Sheets-Sheet 1

RODNEY R. WOOD,
INVENTOR.

BY Lyon & Lyon
ATTORNEYS

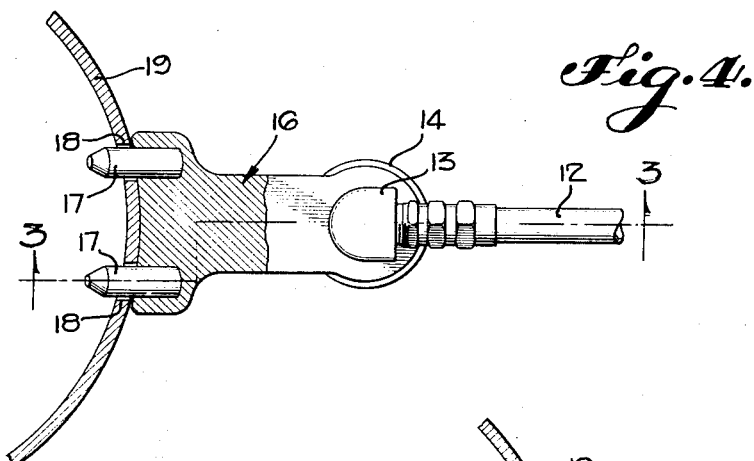
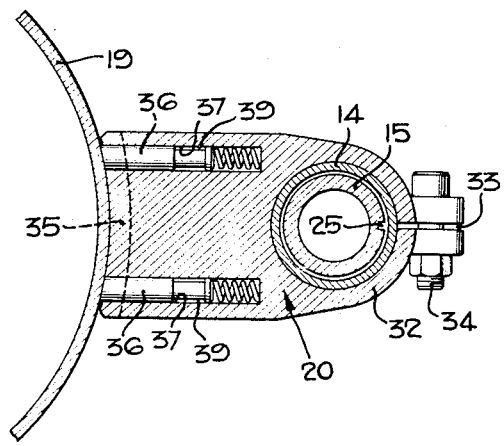
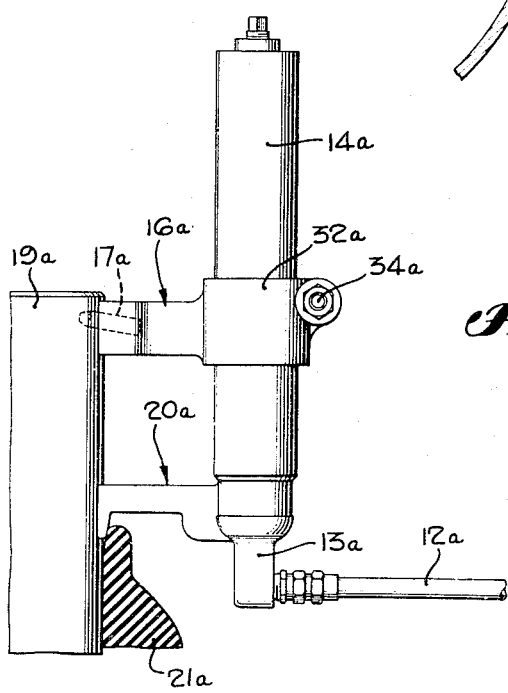

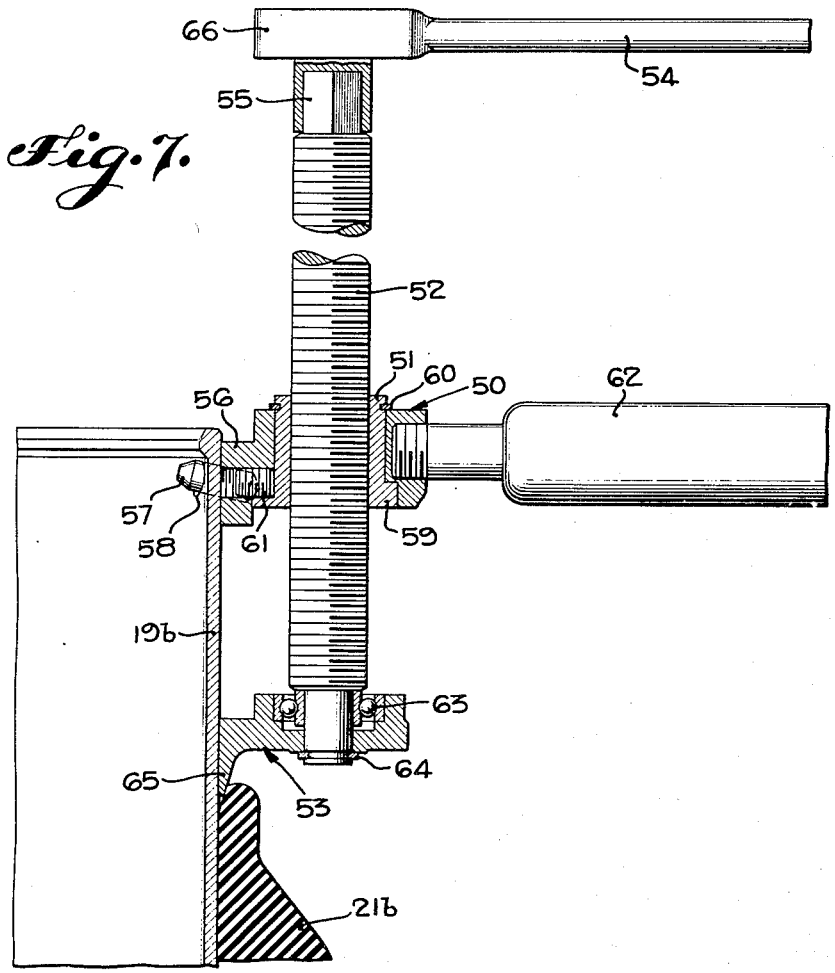
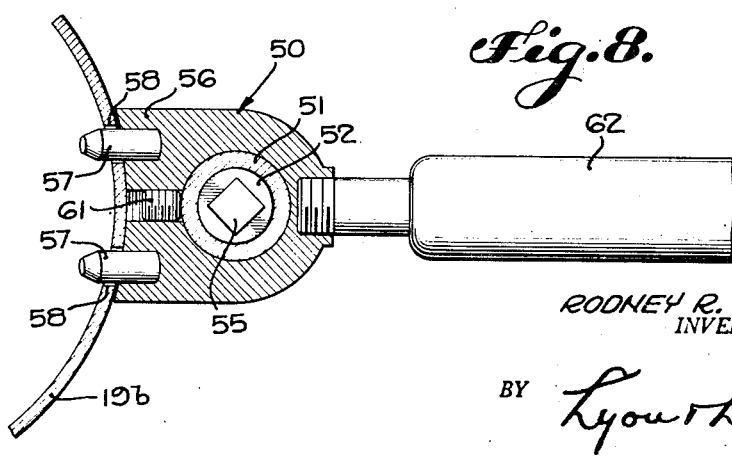

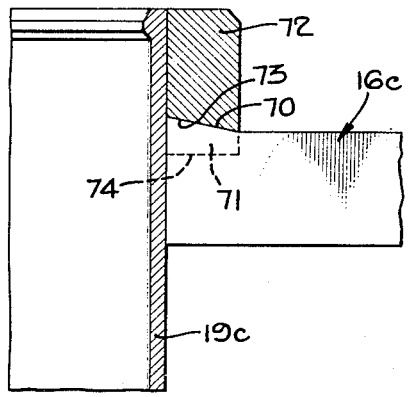
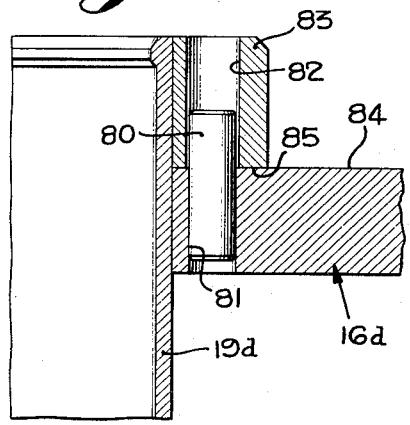
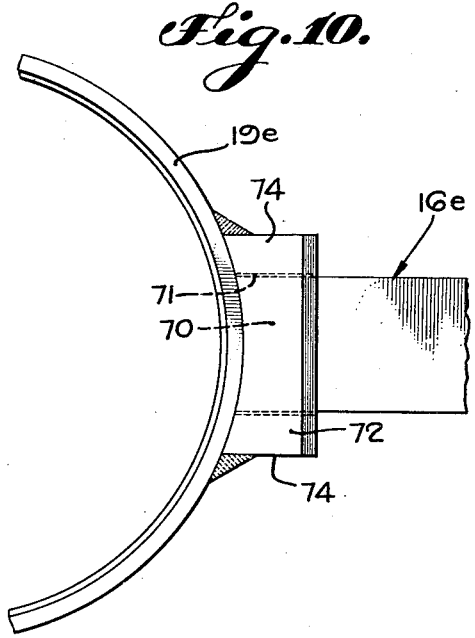
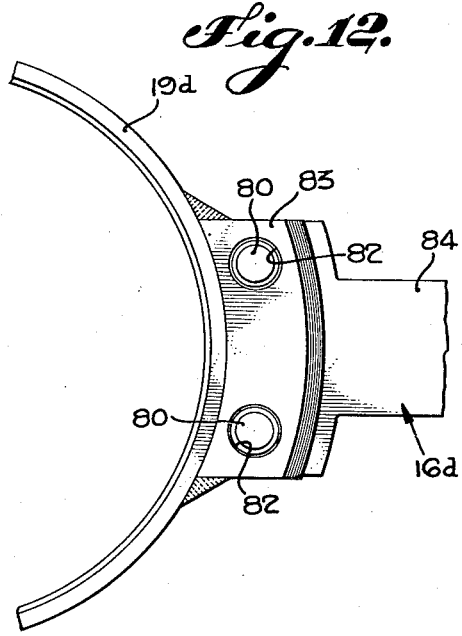

United States Patent Office 2,693,633
Patented Nov. 9, 1954

2,693,633

TRANSFER APPARATUS FOR DRILL PIPE PROTECTORS

Rodney R. Wood, Burbank, Calif., assignor to Byron Jackson Co., Vernon, Calif., a corporation of Delaware Application June 16, 1949, Serial No. 99,504

6 Claims. (Cl. 29—236)

This invention relates to improvements in apparatus for installing protector collars on drill pipe and the like, and is particularly directed to improved apparatus for sliding resilient protector collars off of nonresilient transfer sleeves. In the art of rotary well drilling it has become common practice to provide rubber-like protector collars at intervals on the drill pipe in order to reduce wear on the drill pipe and the connection fittings known as tool points and couplings. The protector collars are usually composed of natural or synthetic rubber or rubber compound and are spaced at intervals along the pipe to reduce wear on the drill pipe tool joints and on the casing.

These protector collars ordinarily comprise annular rings which encircle the pipe to be protected. In order that they may tightly grip the pipe and thereby prevent slippage, the protector collars are initially formed with their internal diameters smaller than the external diameter of the pipe. Accordingly, it is required that the protector collars be expanded to permit their being slipped over the pipe.

It has become common practice in the art to first expand the protector collar and slip it onto a cylindrical steel sleeve having an inside diameter slightly larger than the outside diameter of the drill pipe and tool joints and then to transfer the protector collar directly from such cylindrical sleeve onto the drill pipe. Cylindrical sleeve transfer means of this type are commonly known as transfer sleeves. The mechanism for transferring the protector collar from such transfer sleeves to the drill pipe is the subject matter of the present invention.

Several devices have heretofore been used for this purpose comprising, among others, mechanical screwjack means adapted to push the protector from the transfer sleeve onto the drill pipe by the abutment of pressure rings and the like, and fluid actuated abutment means constructed integrally with the transfer sleeve. The difficulty with these and similar expedients is that such means ordinarily constitute heavy, unwieldy articles. Frequently a drill string composed of many sections of drill pipe must be fitted with protector collars adjacent the ends of each section. This entails a lifting of each protector-bearing transfer sleeve, a placing of same over the drill pipe, a transfer of the protector to the drill pipe, and a removal of the transfer sleeve from the drill pipe. Therefore, manipulation of any excessive weight in addition to the weight of the transfer sleeve alone causes considerable loss of time in applying the protector to the drill pipe, involves increased labor expense, and is likely to result in accidents. In addition, transfer apparatus prior to the present invention, such as the means outlined above, generally have not been suitable for use with the different sized transfer sleeves necessitated by different sized drill pipe, being rather limited to a single size transfer sleeve.

In the copending application of Albert L. Stone, Serial No. 275,136, filed March 6, 1952, now Patent No. 2,674,034, dated April 6, 1954 (a continuation of Stone application Serial No. 59,567, filed November 12, 1948), there is shown an apparatus for transferring protector collars from a transfer sleeve to a drill pipe which avoids the limitations mentioned above and provides a satisfactory device for this purpose. This apparatus comprises, briefly, a body section having a sleeve-engaging arm adapted to rigidly anchor such section to a circumferential flange formed on one end of the transfer sleeve, this body section including a piston; and a cylinder section slidable on the body section having a protector-engaging arm adapted to engage the lip of the protector collar. Upon the introduction of fluid pressure between the piston and cylinder, the cylinder is urged away from the piston to thereby cause the protector-engaging arm to force the protector axially from the end of the transfer sleeve. This apparatus is capable of satisfactorily transferring protectors from a transfer sleeve onto a drill pipe, being light in weight, easy to handle, and positive in its operation. In addition, the apparatus is operable with different sized transfer sleeves so that it is unnecessary to provide another size apparatus to accommodate a changed size of transfer sleeve applicable to a changed size of drill pipe.

However, in the apparatus disclosed in the aforementioned copending application, the body section is securely affixed to the transfer sleeve against axial movement relative thereto in either direction, and hence the operator is subjected to the substantial reaction force or "kick" given the sleeve by the resilient protector collar in its final stage of leaving the transfer sleeve. This "kick" occurs shortly after the major portion of the protector collar has been forced onto the drill pipe and is caused by the release of stresses within the expanded protector collar. This internal stress in the intermediate flared portion of the protector collar between the portion on the pipe and the portion remaining on the transfer sleeve produces a force having a rearwardly acting component which tends to expel the transfer sleeve outwardly and away from the protector collar. This force is opposed by the friction between the protector collar and the transfer sleeve, which friction is obviously progressively reduced as the protector is forced off the sleeve. At some intermediate point in the operation this force becomes greater than the opposing friction force, and thereafter the ratio of this force to the friction force increases rapidly, resulting in a rapid acceleration of the relative movement between the protector collar and the sleeve. Inasmuch as at that time the major portion of the protector collar is in tight gripping engagement with the heavy drill pipe and is therefore held stationary, the reaction force subjects the relatively light transfer sleeve to a powerful rearward "kick." If the transfer apparatus is securely affixed to the transfer sleeve it also is subjected to the same "kick." It will be readily observed that, should the operator continue to grip the device, he will be subjected to the shock of this sharp "kick." However, if he releases his grip on the apparatus, both the transfer sleeve and the attached transfer device will be impelled from the protector collar; repetition of this movement is likely to result in serious damage to the device. Accordingly, it has been found desirable to provide some means for attaching the protector transfer device to the transfer sleeve which, while providing a rigid, positive connection therebetween during the transfer operation, would allow said device to be readily disengaged from the transfer sleeve at such time as the protector collar is finally snapped off the sleeve onto the drill pipe. The present invention provides a protector collar transfer device incorporating such attachment means. It also provides such a device which is simpler and less expensive to construct than that shown in the aforementioned Patent No. 2,674,034. In addition, the use of the protector transfer device of my present invention also permits the utilization of a simpler and less expensive transfer sleeve than that required for use with the abovementioned apparatus.

It is a principal object of this invention to provide attachment means on a protector collar transfer apparatus which affords a rigid connection thereof with the transfer sleeve during the initial, power-applying phase of the transfer operation, and yet which will facilitate disengagement of said apparatus from the transfer sleeve at that point in the transfer operation where the expanded portion of the protector collar sharply impels the transfer sleeve outward and away from the protector collar.

It is another object of this invention to provide protector transfer apparatus which permits the use of transfer sleeves of simpler and less expensive construction than heretofore.

Further objects and advantages of the invention will appear hereinafter.

In the drawings:

Figure 4 shows a view partly in top plan and partly in transverse section on line 4—4 of Figure 3.

Figure 5 shows a cross-sectional view of the apparatus taken on line 5—5 of Figure 3.

Figure 6 shows a side elevation of a modification of the protector collar transfer apparatus which incorporates the transfer sleeve attachment means of the present invention.

Figure 7 shows a longitudinal sectional view of a modification embodying a mechanically actuated protector collar transfer apparatus.

Figure 8 shows a top plan view of the apparatus shown in Figure 7.

Figure 9 shows a fragmentary longitudinal sectional view of another alternative embodiment of the invention.

Figure 10 shows a fragmentary top plan view of the alternative embodiment of Figure 9.

Figure 11 shows a fragmentary longitudinal sectional view of another alternative embodiment of the invention.

Figure 12 shows a fragmentary top plan view of the alternative embodiment of Figure 11.

Figure 2:
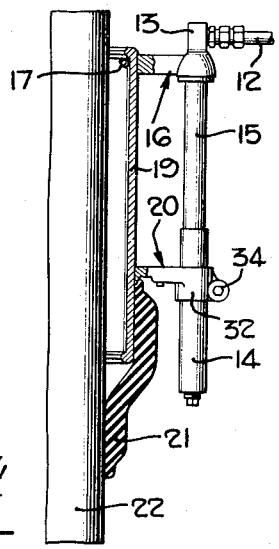
Figure 2 shows a fragmentary view of the apparatus midway in the protector-transferring operation.
Figure 3:
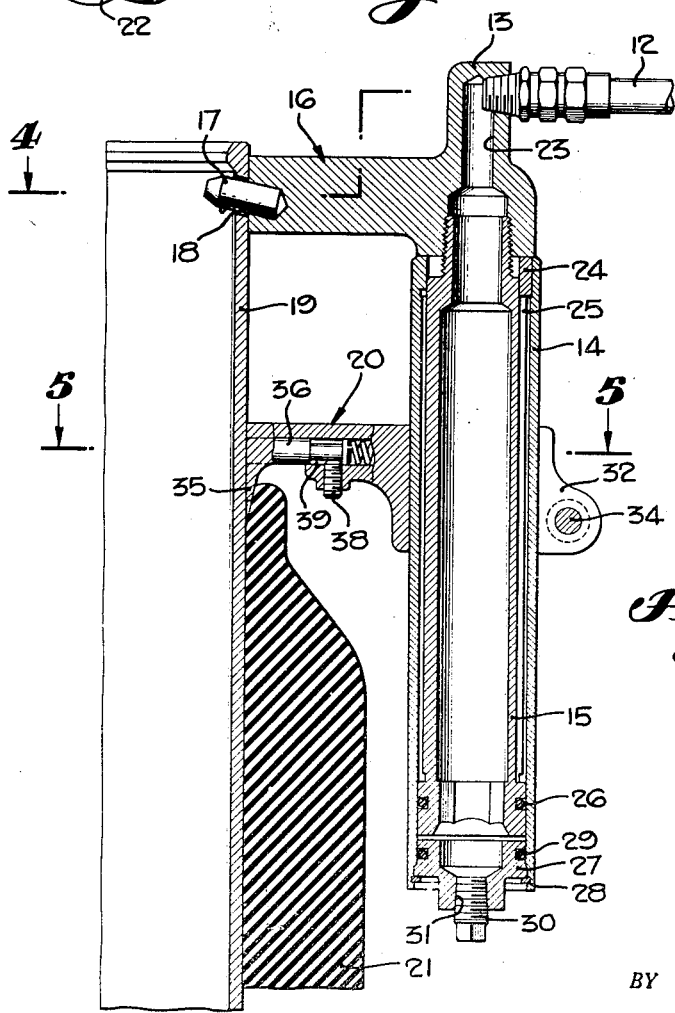
Figure 3 shows an enlarged longitudinal sectional view of the apparatus shown in the position assumed in Figure 1, with the upper portion thereof taken on line 3—3 of Figure 4.

Referring to the drawings, the general assembly of the apparatus consists of a pump 10 which may be operated by a foot pedal 11 to deliver fluid through a conduit 12 to a head 13 to force downwardly a cylinder 14 mounted slidably on a stationary plunger 15; if desired, a motor driven pump (not shown) may be substituted for the foot operated pump as a fluid pressure source. Referring to Figures 3 and 4, integral with the head 13 is a sleeve-engaging arm 16. The arm 16 carries two pins 17 adapted to be inserted into holes 18 formed in the side wall of the transfer sleeve 19. Carried by the cylinder 14 is a protector-engaging arm 20 adapted, as shown in Figure 2, to force the protector collar 21 from the transfer sleeve 19 onto the drill pipe 22 upon the application of fluid pressure.

More particularly, the stationary plunger 15 may be threadedly secured to the head 13. The plunger 15 is hollow and open at both ends and forms a continuous passage communicating with the bore 23 in the head 13. Slidable on the plunger and splined thereto by means of a key 24 and keyway 25 is the cylinder 14. The lower end of plunger 15 is sealed to the inner wall of the cylinder 14 by sealing means such as the O-ring 26. A cylinder head or plug 27 closes the lower end of cylinder 14 and is held in place by a snap ring 28 and sealed by a similar O-ring 29. A plug 30 is threadably received in a bore 31 centrally formed in the cylinder head 27; this plug may be removed to permit bleeding of entrapped air from the cylinder when desired.

The pins 17 are rigidly secured in sockets formed in the end wall of the arm 16 and adapted to be inserted into the holes 18 formed in the transfer sleeve 19. It will be noted that these pins project in a direction inclined toward the axis of the transfer sleeve and away from the protector-engaging arm 20. It will also be noted that the holes 18 in the sleeve are formed at a corresponding angle. The purpose of these pins and holes is to prevent relative movement between plunger 15 and transfer sleeve 19 upon the introduction of fluid pressure into bore 23.

Adjustably affixed to cylinder 14 is the protector-engaging arm 20, said arm including a hub portion 32 bored to receive the cylinder. The hub portion is split at 33 and provided with a clamping bolt 34. The protector-engaging arm 20 has a lip 35 adapted to be inserted under the upper edge of protector collar 21 and thus assure positive coaction between the protector collar and arm 20. As shown in Figure 5, arm 20 is also provided with a pair of spring-urged plungers 36 mounted in the bores 37 to abut against the side of the transfer sleeve 19, maintaining the axis of cylinder 14 and plunger 15 parallel with that of the transfer sleeve 19. These plungers 36 provide a secondary protector-engaging means to accommodate different sized transfer sleeves, said plungers being adapted to engage portions of the resilient protector collar 21 which might otherwise, in the use of outsized transfer sleeves, wedge between the sleeve 19 and arm 20 and bind the apparatus. It is to be noted that the outward movement of the plungers 36 is limited by the stop pins 38 engageable in slots 39 in the said plungers.

Figure 1:
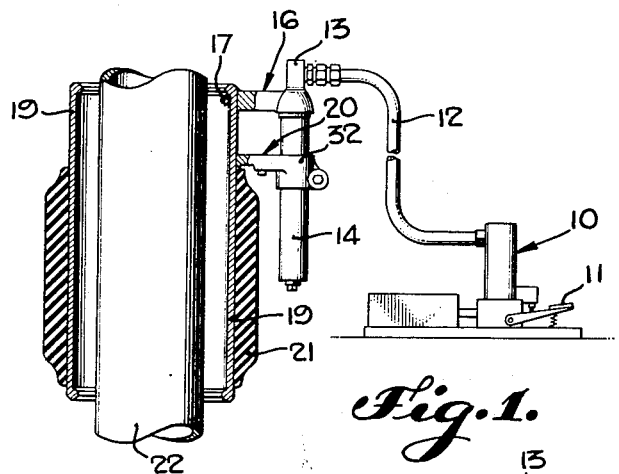
Figure 1 shows a side elevational view of a protector transfer apparatus incorporating the present invention affixed to a transfer sleeve and in position to exert pressure on a protector collar to transfer the same from the transfer sleeve onto the drill pipe.

In the operation of transferring a protector collar 21 from a transfer sleeve 19 onto a pipe 22, the transfer sleeve encircled by a protector collar is ordinarily first placed about the pipe, preferably adjacent a tool joint (not shown). The transfer apparatus is then brought up to the transfer sleeve 19 and the pins 17 inserted into the holes 18 formed in the side wall of the sleeve 19. In this position of the apparatus, the protector-engaging arm 20 abuts the side of the transfer sleeve 19, and the plungers 36 assist in aligning the apparatus. Since there are ordinarily a number of protector-bearing transfer sleeves from which the protector collars must be transferred onto the drill pipe, it will be understood that the herein-described operation constitutes a continuous cycle, and ordinarily it will be found that each group of protector-bearing transfer sleeves will have their protector collars mounted in approximately the same place with respect to the holes 18 formed in the transfer sleeve. Occasionally, however, as with the introduction of a new group of protector-bearing transfer sleeves, it will be found that the protector collars are in different relative positions, and since it is desirable that before the application of fluid pressure the lip 35 of the protector-engaging arm 20 be closely adjacent or touching the protector collar 21, the bolt 34 may be loosened to slide the arm on the cylinder 14 to its proper position, as shown in Figures 1 and 3, preparatory to the application of fluid pressure.

Proper positioning of the apparatus having been accomplished, the operator presses upon foot pedal 11 admitting fluid pressure into the bore 23 and hollow plunger 15. The fluid pressure forces the cylinder 14 downwardly with respect to the plunger 15. Since the cylinder 14 carries the arm 20, the arm forces the protector collar 21 downwardly along the transfer sleeve 19 until the elasticity of the protector material snaps the lower end of the protector collar 21 over the lower end of the transfer sleeve 19 and onto the drill pipe 22. It should be observed that as lip 35 of arm 20 initially pressurally contacts the upper edge of the protector, the plunger 15 and hence sleeve-engaging arm 16 are urged upwardly with respect to the transfer sleeve 19, as viewed in Figure 3. At this point, and during the subsequent movement of the cylinder 14 upon the plunger 15, due to the inclined mounting of pins 17 on arm 16, this upward reaction is effective to maintain arm 16 and consequently the plunger 15 rigidly attached to the transfer sleeve 19. Arm 20 continues to force the protector collar downwardly until the major portion thereof is disposed upon the drill pipe (as shown in Figure 2). At this point the upward force resulting from the internal stresses in the protector collar overcomes friction between the protector collar and the transfer sleeve and forces the transfer sleeve upwardly and away from the protector collar. The net or resultant force effective to expel the transfer sleeve from within the protector increases rapidly as the frictional area between the protector and the sleeve is reduced, and attains such final magnitude that the transfer sleeve is expelled violently at high speed. In the embodiment of the invention shown in Figures 3 and 4, the engagement of the pins 17 with the holes 18 in the sleeve tends to cause the transfer apparatus to be expelled upwardly with the sleeve. However, the operator's grasp on the transfer apparatus exerts a restraining force thereon at a point offset laterally from the line of application of force by the sleeve on the transfer apparatus, thus producing a moment in a clockwise direction as viewed in Figure 3. This moment, acting about the tip of the lip 35 as a center or fulcrum, causes the pins 17 to be withdrawn from the holes 18, thus detaching the transfer apparatus from the sleeve. The upward and inward inclination of the pins 17 also produces a camming action which assists in the retraction of the pins.

Although in the accompanying drawings the transfer apparatus is shown in a position to force the protector collar downwardly over the lower end of the transfer sleeve, it should be noted that operators frequently prefer to mount the apparatus on the drill pipe in an inverted position and thus force the protector collar upwardly onto the drill pipe. It is also customary to apply the protectors to the pipe in a horizontal position, such as on the pipe rack, by forcing the protector off the end of the sleeve remote from the adjacent tool joint. In each of these instances there is a possibility of damage to the transfer apparatus shown in the aforementioned Patent No. 2,674,034 resulting from the hook-shaped sleeve clamp striking the upper shoulder on the drill pipe tool joint. By the provision of a releasable connection such as is provided by the pins 17 of the instant apparatus, the danger of damage to the transfer apparatus from this source is entirely eliminated inasmuch as the transfer apparatus is not in this case subjected to the expelling force exerted on the transfer sleeve by the protector.

It will be noted that the transfer apparatus just described is similar in many respects to the apparatus described in the aforementioned Patent No. 2,674,034, the principal difference therebetween being the means utilized to connect the transfer power means to the transfer sleeve. The provision of the readily disengageable connecting means between the power-operated transfer device and the transfer sleeve shown in the present application not only increases the ease and safety of the protector transfer operation, but, in addition, the provision of such means substantially decreases the cost of manufacturing both the protector transfer device and the transfer sleeve. With respect first to the protector transfer device, it will be seen that the relatively complex clamp and plunger assembly required by the device shown in the copending application is eliminated in favor of the two pins 17. As to the transfer sleeve, it will be noted that it is necessary when using a protector transfer device equipped with the aforementioned clamp and plunger assembly to provide for use therewith a transfer sleeve having an arcuate internal flange machined on one of its ends; however, it is only necessary to provide two pin-receiving holes in the side wall of the transfer sleeve used with a protector transfer device equipped with the connecting means shown in the principal embodiment of the present invention. It should also be observed that a single pin of larger cross-section could be utilized in this embodiment in place of the two pins 17.

Figure 6 shows a modified form of the protector transfer device in which the sleeve-engaging arm 16a and the protector-engaging arm 20a are reversed in position with respect to the transfer sleeve 19a. Accordingly, in this modification, the sleeve-engaging arm 16a is formed integrally with split hub 32a, which hub is adjustably clamped to cylinder 14a by bolt 34a, and the protector-engaging arm 20a is formed integrally with the head 13a. Although sleeve-engaging arm 16a is identical in construction to arm 16 of the device shown in Figures 1 through 5 and includes the inclined pins 17a, the protector-engaging arm 20a is of unitary construction and does not incorporate counterparts of the spring-urged plungers 36. To remove the protector collar 21a from the transfer sleeve 19a, the device is positioned upon the sleeve as shown in Figure 6, and fluid pressure admitted to the device through conduit 12a so that the hollow plunger is urged downwardly with respect to the cylinder. Consequently, head 13a and protector-engaging arm 20a are also urged downwardly to force the protector collar 21a off the sleeve 19a and onto the drill pipe. The manner in which this form of the invention is released from the transfer sleeve during expulsion of the sleeve from the protector is obviously the same as with the embodiment of Figures 3 and 4.

Figures 7 and 8 show a manually actuated protector transfer device incorporating the readily disengageable transfer sleeve attachment means of the present invention. This device comprises a body member 50 to receive a nut member 51, the threads of which engage an externally threaded jackscrew 52. This jackscrew supports at its lower end a protector-engaging arm 53. The jackscrew 52 may be turned within nut member 51 by means of a suitable wrench 54, which wrench engages a short hub 55 of square cross-section formed at the upper end of the jackscrew. The wrench may be provided with a ratchet head 66. Integral with body member 50 is a sleeve-engaging arm 56 which carries inclined pins 57 within sockets formed in its outer end. These pins are mounted in arm 56 in the identical manner that pins 17 are mounted in the arm 16 of the initially described embodiment of the invention, and are adapted to be inserted into holes 58 formed in transfer sleeve 19b. Nut member 51 is restrained against axial movement within body member 51 by a flange 59 and a retaining ring 60, and against relative rotation therewith by a setscrew 61. A gripping handle 62 which is threadedly secured to the outer end of body member 50 facilitates the operation of the device. Protector-engaging arm 53 is bored to receive a bearing 63 journaled upon the jackscrew 52 and a retaining ring 64 on the jackscrew 52 prevents axial displacement of the bearing. Arm 53 includes a lip 65 adapted to abut transfer sleeve 19b and engage the upper edge of a protector collar 21b. It will be seen that turning of jackscrew 52 within nut member 51 will effect axial movement of the jackscrew and arm 53 with respect to the transfer sleeve 19b. Thus, in order to force a protector collar 21b off the lower end of the transfer sleeve 19b onto a drill pipe, the device is first positioned on the sleeve with its elements arranged as shown in Figures 7 and 8. Next, wrench 54 is turned to cause downward movement of jackscrew 52 and arm 53, until such time as the major portion of the protector collar 21b has been forced downwardly over the lower end of the transfer sleeve onto the drill pipe. At this time the transfer sleeve will be sharply impelled upwardly away from the protector collar and the transfer device will be detached from the sleeve, all as described above. It is preferable that the wrench 54 be of the ratchet type in order that the handle thereof may continually be maintained in such a position that the operator's hands will not be endangered by virtue of being located between the edge of the transfer sleeve and the wrench handle when the sleeve is upwardly impelled.

Referring now to Figures 9 and 10, an alternative attachment means is shown for disengageably connecting the aforedescribed protector transfer devices to a transfer sleeve. In this embodiment of the invention, the protector transfer device is provided with a sleeve-engaging arm 16c having an upwardly flared outer end portion defining an inclined abutment surface 70. The flared outer end portion of arm 16c is adapted for insertion into a recess 71 formed in an anchor block 72, which block is integrally affixed, preferably by welding, to one end of the protector-bearing transfer sleeve 19c. When the sleeve-engaging arm 16c is thus positioned, the abutment surface 70 thereof will fit within the complementary, axially and transversely opposed abutment surface 73, which latter surface is defined by the closed upper end of the recess 71. Upward movement of the protector transfer device with respect to the transfer sleeve 19c will be prevented by the abutment of the two axially and transversely opposed surfaces 70 and 73. Further, because of the inclination of these surfaces with respect to the transfer sleeve, such movement will be effective to urge the outer end of the sleeve-engaging arm 16c transversely into firm contact with the transfer sleeve 19c. Circumferential movement of retaining arm 14a is prevented by the parallel ribs 74 forming lower extensions of anchor block 72 and defining the sides of recess 71. When, however, the major portion of the protector collar has been transferred onto the drill pipe and the transfer sleeve is suddenly forced upwardly away from the protector collar, the protector transfer device is instantly disengageable from anchor block 72, inasmuch as the inner end of the sleeve-engaging arm 16c is free to slide out of the recess 71 upon such upward axial movement of the sleeve.

Referring now to Figures 11 and 12, a second alternative attachment means is shown for disengageably connecting the protector transfer device to a transfer sleeve. In this embodiment a pair of upwardly extending pins 80 are rigidly secured in sockets 81 formed in the outer end portion of the sleeve-engaging arm 16d. These pins 80 are adapted to be inserted into axially extending bores 82 formed in an anchor block 83 integrally affixed, preferably by welding, to one end of the transfer sleeve 19d. When the pins 80 are thus positioned, upward axial movement of the protector transfer device with respect to the transfer sleeve will be restrained during the transfer operation, by reason of the engagement of the end portion of the upper surface 84 of arm 16d with the lower surface 85 of the anchor block 83. Transverse and circumferential movement will be prevented by the engagement of the pins 80 with the bores 82. At such time as the protector collar snaps onto the drill pipe and the transfer sleeve 19d is suddenly forced upwardly away from the protector collar, the transfer device is instantly disengageable from anchor block 83 as pins 80 withdraw from bores 82.

Having fully described my invention, it is to be understood that I do not wish to be limited to the details herein set forth, but my invention is of the full scope of the appended claims.

I claim:

1. Portable apparatus for forcing an elastic drill pipe protector axially onto a pipe from an encompassing transfer sleeve having a transverse hole therein extending inwardly from the outer wall thereof and providing an abutment surface adjacent said outer wall, said apparatus comprising: extensible force applying means having relatively rectilinearly movable members, anchor means carried by one of said members, pusher means carried by the other of said members, said anchor means and pusher means extending in the same direction laterally of the direction of relative movement of said members, said anchor means comprising a pin projecting laterally from said one member and being of a size to fit loosely in said hole and engage said abutment surface thereby providing ready removal of said pin from said hole by substantially radially outward movement thereof with respect to the axis of said sleeve upon release of pressure between said pin and said abutment surface, said pusher means having a relatively small surface adjacent the outer end thereof engageable with an end portion of said protector, said anchor and pusher means being substantially in alignment in the direction of relative movement of said members whereby said apparatus may be engaged with or disengaged from said sleeve and protector from one side and entirely within a narrow sector thereof.

2. Apparatus as set forth in claim 1, wherein said pin is inclined in a direction extending toward the axis of said sleeve and away from said pusher member and said protector.

3. Apparatus as set forth in claim 1, wherein said relatively rectilinearly movable members comprise cooperating fluid-actuated piston and cylinder members.

4. Portable apparatus for forcing an elastic drill pipe protector axially onto a pipe from an encompassing transfer sleeve having a pair of transverse holes therein extending inwardly from the outer wall thereof and providing abutment surfaces adjacent said outer wall, said apparatus comprising: extensible force applying means having relatively rectilinearly movable members, anchor means carried by one of said members, pusher means carried by the other of said members, said anchor means and pusher means extending in the same direction laterally of the direction of relative movement of said members, said anchor means comprising a pair of pins projecting laterally from said one member and being of a size to fit loosely in said holes and engage said abutment surfaces thereby providing ready removal of said pins from said holes by substantially radially outward movement thereof with respect to the axis of said sleeve upon release of pressure between said pins and said abutment surfaces, said pusher means having a relatively small surface adjacent the outer end thereof engageable with an end portion of said protector, said anchor and pusher means being substantially in alignment in the direction of relative movement of said members whereby said apparatus may be engaged with or disengaged from said sleeve and protector from one side and entirely within a narrow sector thereof.

5. Apparatus as set forth in claim 4, wherein said pins are inclined in a direction extending toward the axis of said sleeve and away from said pusher member and said protector.

6. Apparatus as set forth in claim 4, wherein said relatively rectilinearly movable members comprise cooperating fluid-actuated piston and cylinder members.

References Cited in the file of this patent

UNITED STATES PATENTS

| Number | Name | Date |
|---|---|---|
| 1,135,271 | Edwards | Apr. 13, 1915 |
| 1,524,753 | Schwerin | Feb. 3, 1925 |
| 2,135,278 | Countryman | Nov. 1, 1938 |
| 2,165,504 | Pfauser | July 11, 1939 |
| 2,183,842 | Mandl | Dec. 19, 1939 |
| 2,232,247 | Laub | Feb. 18, 1941 |
| 2,291,976 | Minor | Aug. 4, 1942 |
| 2,294,506 | Long | Sept. 1, 1942 |
| 2,328,771 | Barnes | Sept. 7, 1943 |
| 2,440,009 | Graham | Apr. 20, 1948 |
| 2,674,034 | Stone | Apr. 6, 1954 |